United States Patent
Ge et al.

(10) Patent No.: US 11,338,517 B2
(45) Date of Patent: May 24, 2022

(54) PRINTHEAD ASSEMBLY WITH LIGHT EMISSION DEVICES AND PHOTON DETECTORS

(71) Applicant: HEWLETT-PACKARD DEVELOPMENT COMPANY, L.P., Houston, TX (US)

(72) Inventors: Ning Ge, Palo Alto, CA (US); Steven J. Simske, Fort Collins, CO (US); Lihua Zhao, Palo Alto, CA (US); David George, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 807 days.

(21) Appl. No.: 16/076,339

(22) PCT Filed: Apr. 21, 2017

(86) PCT No.: PCT/US2017/028956
§ 371 (c)(1),
(2) Date: Aug. 8, 2018

(87) PCT Pub. No.: WO2018/194680
PCT Pub. Date: Oct. 25, 2018

(65) Prior Publication Data
US 2021/0197487 A1    Jul. 1, 2021

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS

| 6,193,923 B1 | 2/2001 | Leyden et al. |
| 6,641,246 B2 | 11/2003 | Endo et al. |
| (Continued) | | |

FOREIGN PATENT DOCUMENTS

| EP | 2159058 A1 | 3/2010 |
| WO | WO-2016040453 A1 | 3/2016 |
| WO | WO-2016195620 A1 | 12/2016 |

OTHER PUBLICATIONS

"Printhead Technology Explained by the Expert", Retrieved from internet—http://www.paperandprint.com/digital-labels-and-packaging/features/dlp-2016/august-2016/17-08-16-printhead-technology-explained-by-the-expert.aspx#.WM9pKG-GMdU, Aug. 17, 2016, 8 Pages.

*Primary Examiner* — Philip C Tucker
*Assistant Examiner* — Evan T Hulting
(74) *Attorney, Agent, or Firm* — Mannava & Kang

(57) ABSTRACT

According to examples, an apparatus may include a printhead assembly containing a housing supporting a printhead. The printhead may have nozzles that are to fire droplets of a functional agent onto a layer of build material particles along respective flight paths to form sections of a 3D object from the build material particles, an array of light emission devices to direct respective light beams in the respective flight paths, and an array of photon detectors to detect respective light beams directed from a light source of the array of light emission devices, the light emission devices and the photon detectors being supported on the housing. The apparatus may also include a controller to determine whether any of the nozzles is operating improperly based upon whether the photon detectors detected the light beams and to output an instruction regarding an improperly operating nozzle in response to a determination that the nozzle is operating improperly.

15 Claims, 6 Drawing Sheets

(51) Int. Cl.
*B29C 64/282* (2017.01)
*B29C 64/209* (2017.01)
*B29C 64/268* (2017.01)
*B33Y 10/00* (2015.01)
*B33Y 30/00* (2015.01)
*B33Y 50/02* (2015.01)

(52) U.S. Cl.
CPC .......... *B29C 64/268* (2017.08); *B29C 64/282* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,177,318 B2 | 5/2012 | Govyadinov et al. |
| 8,449,068 B2 | 5/2013 | Govyadinov |
| 8,864,289 B2 | 10/2014 | Govyadinov et al. |
| 9,134,233 B2 | 9/2015 | Taff et al. |
| 9,302,519 B1 | 4/2016 | Clark |
| 2005/0018006 A1 | 1/2005 | Im et al. |
| 2007/0024658 A1 | 2/2007 | Diol et al. |
| 2012/0195994 A1* | 8/2012 | El-Siblani ............ B29C 64/124 425/174.4 |
| 2015/0224802 A1 | 8/2015 | Kawamichi |
| 2016/0332383 A1 | 11/2016 | Sanchez |
| 2017/0100888 A1 | 4/2017 | Batchelder |
| 2017/0120514 A1* | 5/2017 | Miller .................... A43D 95/14 |

\* cited by examiner

600

```
┌─────────────────────────────┐
│ DETERMINE THAT A NOZZLE IS  │
│      MALFUNCTIONING         │
│            602              │
└─────────────────────────────┘
              │
              ▼
┌─────────────────────────────┐
│ DETERMINE A PRINT QUALITY   │
│ LEVEL SELECTED FOR THE 3D   │
│           OBJECT            │
│            604              │
└─────────────────────────────┘
              │
              ▼
        ╱ PRINT QUALITY ╲        YES    ┌──────────┐
       ╱ LEVEL > CERTAIN ╲──────────────▶│  CEASE   │
       ╲  PRINT QUALITY  ╱               │ PRINTING │
        ╲    LEVEL?     ╱                │   608    │
         ╲     606     ╱                 └──────────┘
              │
              │ NO
              ▼
┌─────────────────────────────┐
│      CONTINUE PRINTING      │
│            610              │
└─────────────────────────────┘
```

*FIG. 6*

PRINTHEAD ASSEMBLY WITH LIGHT EMISSION DEVICES AND PHOTON DETECTORS

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers or volumes of material to an existing surface (template or previous layer). This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology. Additive manufacturing techniques typically employ a layering process in which particles of build material are spread into a layer and selectively fused together. Following that process, additional particles are spread into another layer and selectively fused together. This process is repeated over a number of layers to build up a 3D part having a desired configuration.

BRIEF DESCRIPTION OF THE DRAWINGS

Features of the present disclosure are illustrated by way of example and not limited in the following figure(s), in which like numerals indicate like elements, in which:

FIG. 6 depicts a flow diagram of a method that may be implemented as part of or in place of an operation in FIG. 5.

DETAILED DESCRIPTION

There may be multiple causes for a printhead nozzle to improperly operate, e.g., fail to fire a droplet, fire a droplet having an unintended size, fire droplets at improper times, etc. The causes may include, for instance, an improperly functioning firing element, a blocked or partially blocked nozzle bore, etc. In 3D printing, an improperly operating nozzle may result in 3D objects being formed with partially or improperly fused areas, defects in color, etc. Improperly fused areas may weaken or otherwise cause the formed 3D objects to be defective. As the build material particles as well as the agents used in the printing of 3D objects may be relatively expensive, printing of defective 3D objects may be costly both in terms of monetary costs and the time that it takes to print the 3D objects.

Disclosed herein are apparatuses and methods for detecting a malfunctioning nozzle during 3D object printing operations. The apparatuses disclosed herein may include light emission devices (or equivalently, light sources) and photon detectors (or equivalently, detectors) that are to detect droplets of a functional agent as the droplets are fired from nozzles during a 3D object printing operation. The light emission devices and the photon detectors may be mounted to the same housing as a printhead containing the nozzles to thus enable the light emission devices and the photon detectors to be moved concurrently with the printhead. In this regard, in the apparatuses and methods disclosed herein, droplets may be detected at any point during printing of the 3D object.

According to examples, detection of the droplets during the printing operation may enable real-time detection of malfunctioning nozzles. Real-time detection of malfunctioning nozzles may enable a concurrent determination as to whether to continue with printing of an unfinished 3D object. For instance, when a controller determines that a nozzle has malfunctioned, the controller may stop printing the 3D object and may await further instructions from an operator. In other examples, the controller may implement a mitigation operation that causes another nozzle or other nozzles to deliver droplets onto the locations that the malfunctioning nozzle was intended to deliver the droplets. As such, for instance, through implementation of the apparatuses and methods disclosed herein, defects in printed 3D objects may be reduced and/or the printing of 3D objects may be stopped if it is known to have defects during printing of the 3D objects, which may result in a reduction in wasted build material particles and agents.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
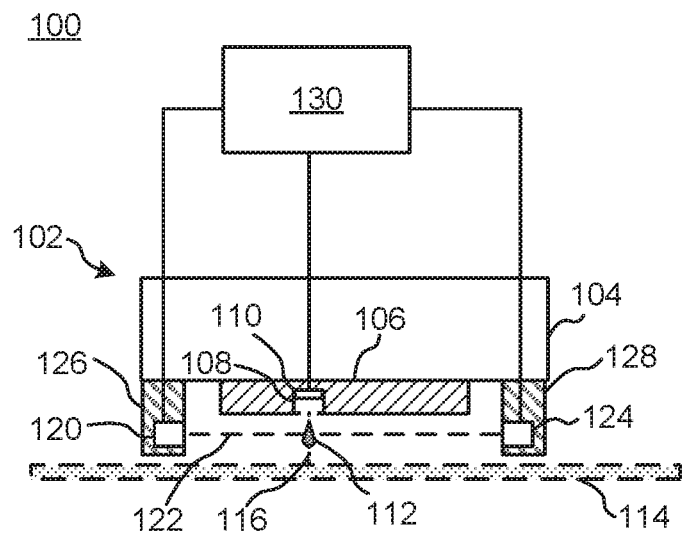
FIGS. 1A and 1B, respectively show a front partially cross-sectional view and a bottom view of a portion of an example apparatus that may be implemented during part of a 3D printing operation.
Figure 1B:
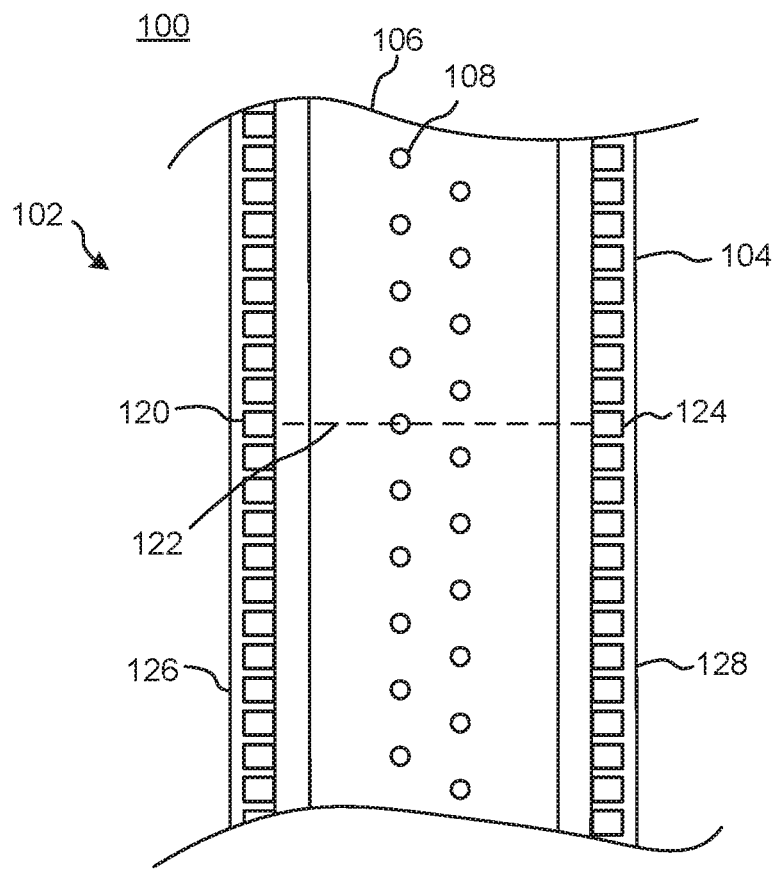

With reference first to FIGS. 1A and 1B, there are respectively shown a front partially cross-sectional view and a bottom view of a portion of an example apparatus 100 that may be implemented during part of a 3D printing operation. It should be understood that the apparatus 100 depicted in FIGS. 1A and 1B may include additional components and that some of the components described herein may be removed and/or modified without departing from a scope of the apparatus 100 disclosed herein.

As shown in FIGS. 1A and 1B, the apparatus 100 may include a printhead assembly 102 that may contain a housing 104 supporting a printhead 106. The printhead 106 may include multiple nozzles 108 arranged along multiple columns (e.g., two columns along a mono-color ink slot) along most or all of a length of the printhead 106. A relatively large number of nozzles 108 positioned in a relatively densely packed arrangement may be provided on the printhead 106 to enable delivery of liquids, e.g., functional agents, from the nozzles 108 at a high resolution, e.g., 600 dpi, 1200 dpi, etc. As shown in FIG. 1B, the nozzles 108 may be arranged in a staggered fashion along the columns of nozzles 108 as the staggered arrangement may enable the nozzles 108 to print at a relatively higher resolution. In other examples, the nozzles 108 in one column may be aligned with the nozzles 108 in the other column or the nozzles 108 may be arranged in a single column. In addition or in other examples, a plurality of printheads 106 may be provided along the housing 104.

In any of the examples discussed above, a respective firing element 110 may be provided within each of the nozzles 108. The firing elements 110 may be any suitable type of firing element known or as yet to be known to be used in printhead nozzles. Examples of suitable types of firing elements 110 may include thermal resistors that may become heated to vaporize a functional agent contained in firing chambers of the nozzles 108 on the firing elements 110 and form bubbles that force the functional agent out of bores of the nozzles 108. Other examples of suitable types of firing elements 110 may include piezoelectric firing elements that may deform when electricity is applied across the piezoelectric elements, in which the deformation forces a functional agent out of the nozzles 108 through respective bores. Further examples of suitable types of firing elements 110 may include mechanical inkjets, which may include solenoid valves that may be opened to provide continuous flow of a functional agent, e.g., deposit the functional agent as a continuous inkjet. Although not shown, the firing chambers may be supplied with the functional agent from an ink delivery system that may include a reservoir containing the functional agent.

The firing elements 110, when activated, may cause droplets 112 of a functional agent to be fired out of the nozzles 108 and delivered onto a layer of build material particles 114. The layer of build material particles 114 has been depicted with dashed lines to indicate that the layer of build material particles 114 may not form part of the apparatus 100. As shown in FIG. 1A, the droplet 112 of the functional agent may follow a flight path 116 from the nozzle 108 to the layer of build material particles 114. In this regard, the droplets 112 fired from the nozzles 108 may each follow a respective flight path 116 from the nozzles 108 to the build material particles 114.

The printhead assembly 102 may also include an array of light emission devices (or sources) 120 that may each direct a respective light beam 122, which is represented by a dashed line, through a respective flight path 116 of a droplet 112. The light emission devices 120 may each be any suitable type of light emitting device that is able to generate and/or direct a focused and/or collimated light beam 122 through the flight path 116 of a droplet 112. By way of particular example, each of the light emission devices 120 may be a vertical-cavity surface-emitting laser (VCSEL) and the light beam 122 may be a laser beam. In other examples, the light sources 120 may be light emitting diodes, laser diodes, or the like.

The printhead assembly 102 may further include a plurality of photon detectors (or simply detectors) 124, e.g., photodetectors, optical detectors, etc., that are to receive the light beams 122 from respective ones of the light emission devices 120. Each of the photon detectors 124 may be positioned to receive a light beam 122 from a respective light emission device 120. In addition, each of the light sources 120 may be positioned to direct light beams 122 across the flight paths 116 of droplets 112 fired from each of the nozzles 108 and each of the photon detectors 124 may be positioned to receive the light beams 122 after the light beams have crossed the flight paths 116. As shown, the light emission devices 120 and the photon detectors 124 may be mounted to the housing 104 via respective supports 126, 128.

When a photon detector 124 receives a light beam 122, the photon detector 124 may generate an electrical signal, e.g., voltage or current, that may correspond to the intensity of the received light beam 122. That is, the strength of the electrical signal may be higher for received light that has a higher intensity. In other examples, the photon detector 124 may generate data corresponding to the detected light intensity, e.g., may generate data that identifies the intensity of the detected light. In any regard, the photon detector 124 may communicate the generated electrical signal and/or data to a controller 130. The intensity of the received light may vary depending upon whether or not a droplet 112 passes through the light beam 122. The intensity of the received light may also vary depending upon the size and/or the composition of the droplet 112 as the droplet 112 passes through the light beam 122. According to examples, the photon detectors 124 may be tested and/or calibrated over time or on a periodic basis to ensure that the photon detectors 124 are operating properly and are accurately detecting the droplets 112.

The controller 130 may be a semiconductor-based microprocessor, a central processing unit (CPU), an application specific integrated circuit (ASIC), a field-programmable gate array (FPGA), graphics processing unit (GPU), Tensor Processing Unit (TPU), and/or other hardware device and may communicate with the firing elements 110, the light sources 120, and the detectors 124 via communication lines. The controller 130 may determine, from the received electrical signal and/or data, whether a droplet 112 was properly fired by a particular nozzle 108, e.g., the nozzle 108 that is to fire droplets 112 along the flight path 116 that intersects the light beam 122. That is, the controller 130 may determine that a droplet 112 was properly fired from the particular nozzle 108 if the received electrical signal or data indicates that the intensity of the light beam 122 is below a certain threshold level, which may include an indication that the detector 124 did not receive the light beam 122. Likewise, the controller 130 may determine that a droplet 112 was properly fired from the particular nozzle 108 if the received electrical signal or data indicates that the intensity of the light beam 122 is above the certain threshold level. In other words, the controller 130 may determine that a droplet 112 was properly fired if the droplet 112 is determined to have passed through the light beam 122 and/or if the droplet 112 is determined to have certain property, e.g., a volume, a composition, etc., that exceeds a certain level.

The controller 130 may additionally or in other examples determine whether a droplet 112 crossed the light beam 122 within a predefined time frame following activation of the firing element 110. That is, when the controller 130 sends a firing instruction to the firing element 110 of a particular nozzle 108, the controller 130 may also send an activation signal to the light emission device 120 that is to direct a light beam 122 through the flight path 116 of the droplets 112 corresponding to that nozzle 108. The activation signal may be kept active for a duration of time that covers a period of time that it normally takes for a droplet 112 or for multiple droplets 112 to be formed and fired from the nozzle 108 and pass through the light beam 122. The duration of time may be determined through testing. The controller 130 may determine when the firing instruction was sent to the firing element 110 and when an electrical signal or data was received from the photon detector 124. The controller 130 may determine whether the droplet 112 crossed the light beam 122 within the predetermined time frame based upon when an electrical signal or data was received from the photon detector 124. If the controller 130 determines that the droplet 112 crossed the light beam 122 within the predetermined time frame, the controller 130 may determine that the droplet 112 was properly fired. However, if the controller 130 determines that the droplet 112 did not cross the light beam 122 within the predetermined time frame, the controller 130 may determine that the droplet 112 was improperly fired.

A droplet 112 may be considered as having been improperly fired if the droplet 112 does not cross the light beam 122 within the predetermined time frame. In addition, or in other examples, a droplet 112 may be considered as having been improperly fired if the droplet 122 crosses the light beam 122 within the predetermined time frame but has an improper property, e.g., has an improper volume, has an improper composition, etc. In instances in which the controller 130 determines that the droplet 112 has been improperly fired, the controller 130 may determine that the nozzle 108 that fired the droplet 112 may be operating improperly or may otherwise be malfunctioning. In response to making this determination, the controller 130 may output an alert such that a user or operator may be notified of the possibility of the improperly operating nozzle 108. In addition, or in other examples, the controller 130 may implement an operation to mitigate errors caused by the improperly operating nozzle 108 or cease firing of the droplets 112 of the functional agent in response to making this determination.

As discussed herein, the functional agent may be a binding agent that is to cause the build material particles 114 upon which the functional agent has been deposited to bind together. In addition or in other examples, the functional agent may be a fusing agent that is to enhance fusing of the build material particles 114 upon which functional agent has been deposited. In these examples, when energy is applied, the functional agent may enhance absorption of the energy by the build material particles 114 upon which the functional agent has been deposited. In other examples, the functional agent may be a detailing agent that is to reduce or inhibit fusing of the build material particles 114 upon which the functional agent has been applied. In addition or in other examples, the functional agent may be a coloring agent that is to apply color to the build material particles 114. In addition or in other examples, the functional agent may change a chemical composition of the build material particles 114 (e.g., for printed metal, black ink providing carbon may become incorporated into a printed stainless steel, ink containing nanoparticles of metal may be locally added into the printed metal (e.g., Cu into Al-alloy, Cr into Ti-alloy), etc.

In addition or in yet further examples, the functional agent may include energetics ink, e.g., ink containing compounds that release substantial amounts of energy when they decompose at elevated temperatures as may occur during exposure of build material particles 114 to energy. This additional heat energy may be used for boosting the melting process of the build material particles 114, particularly when the build material particles 114 are metallic particles.

According to examples, the type of light beam 122 emitted through the flight paths 116 of the droplets 112 may depend upon the luminescent properties of the droplets 112. That is, for example, in instances in which the droplets 112 are transparent and may thus absorb infrared light, the light beams 122 may be infrared light beams. In other examples in which the droplets 112 are opaque, the light beams 122 may be between the infrared and the ultraviolet spectrums. In one regard, therefore, the type of light beam 122 may be tuned to a spectrum that accurately tracks the luminescent properties of the droplets 112.

Figure 1C:
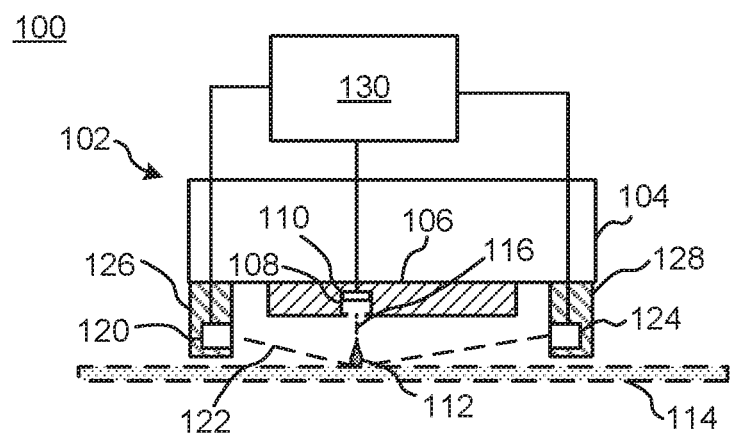
FIG. 1C shows a front partially cross-sectional view of the apparatus depicted in FIGS. 1A and 1B according to another example.

In FIG. 1C, there is shown a front partially cross-sectional view of the apparatus 100 depicted in FIGS. 1A and 1B according to another example. The apparatus 100 depicted in FIG. 1C is similar to the apparatus 100 depicted in FIGS. 1A and 1B except that the path of the light beam 122 in the apparatus 100 depicted in FIG. 1C may reflect off a surface of the layer of build material particles 114. That is, for instance, the light emission devices 120 may be angled to direct the light beams 122 in the manner shown in FIG. 1C and the detectors 124 may also be angled to receive the light beams 122 after the light beams 122 have been reflected off the build material particles 114.

In the example apparatus 100 depicted in FIG. 10, the intensity levels of the light beams 122 received by the photon detectors 124 may vary depending upon whether droplets 112 of a functional agent have been deposited onto intended locations on the surface of the layer of material particles 114. In this regard, the light emission devices 120 may direct light beams 122 at particular locations with respect to the nozzles 108 such that the locations at which the light beams 122 reflect off the surface of a layer of build material particles 114 are the locations at which the droplets 122 are intended to land on the surface of the layer of build material particles 114. In addition, the controller 130 may determine whether the droplets 112 have successfully been deposited at their intended locations on the layer of build material particles 114. In response to a determination that a droplet 112 has not successfully been deposited at its intended location, the controller 130 may determine that a nozzle 108 that was instructed to fire the droplets 112 malfunctioned or otherwise operated improperly. As a result, the controller 130 may output an alert to indicate the issue, may implement mitigation operations, and/or may cease production of a 3D object.

Figure 2A:
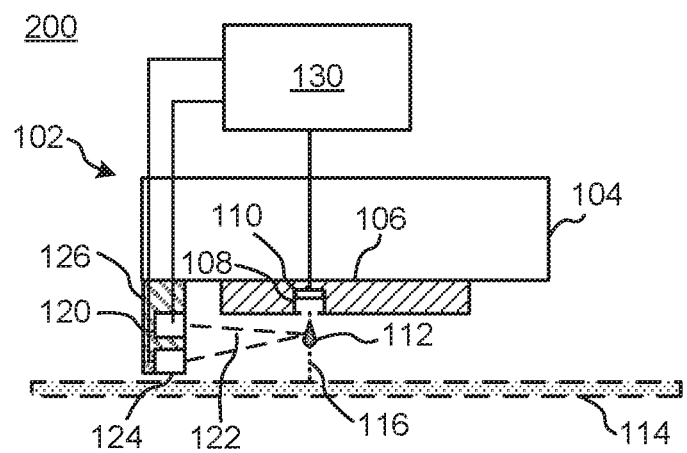
FIGS. 2A and 2B, respectively, show a front partially cross-sectional view and a cross-sectional side view of another example apparatus.
Figure 2B:
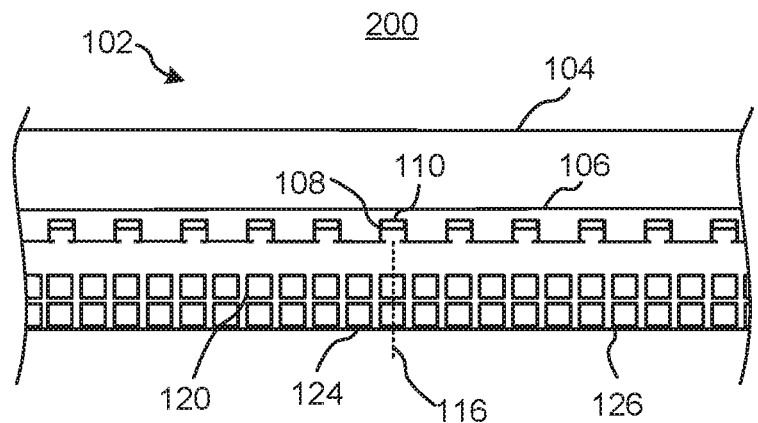

Turning now to FIGS. 2A and 2B, there are respectively shown a front partially cross-sectional view and a cross-sectional side view of another example apparatus 200. It should be understood that the apparatus 200 depicted in FIGS. 2A and 2B may include additional components and that some of the components described herein may be removed and/or modified without departing from a scope of the apparatus 200 disclosed herein.

The apparatus 200 depicted in FIGS. 2A and 2B includes features similar to those contained in the apparatus 100 depicted in FIGS. 1A and 1B. In the apparatus 200, however, the detectors 124 are depicted as being mounted to the same support 126 as the light sources 120. That is, both the array of light sources 120 and the array of detectors 124 are depicted as being positioned on the same side with respect to an array of nozzles 108. In this regard, a detector 124 may detect a light beam 122 emitted from a light source 120 after the light beam 122 has been reflected from a droplet 112 as shown in FIG. 2A. That is, the detector 124 may not output a signal or may output a first signal when the detector 124 does not detect the light beam 122 reflected or otherwise emitted from the droplet 112 and the detector 124 may output a second signal when the detector 124 detects the light beam 122 emanating from the droplet 112. The controller 130 may determine whether a particular nozzle 108 properly fired a droplet 112 from the received signal from the detector 124.

In FIGS. 2A and 2B, a single row of nozzles 108 are depicted. It should, however, be understood that an additional row of nozzles 108 may be provided along the printhead 106 as depicted in FIG. 1B. In this regard, the additional row of nozzles 108 may be aligned with the light sources 120 and the detectors 124 that are not depicted as being aligned with nozzles 108 in FIG. 2B. The light sources 120 may emit light beams 122 having wavelengths that may fall within one or more of a visible spectrum, a UV spectrum, and an IR spectrum.

Figure 3:
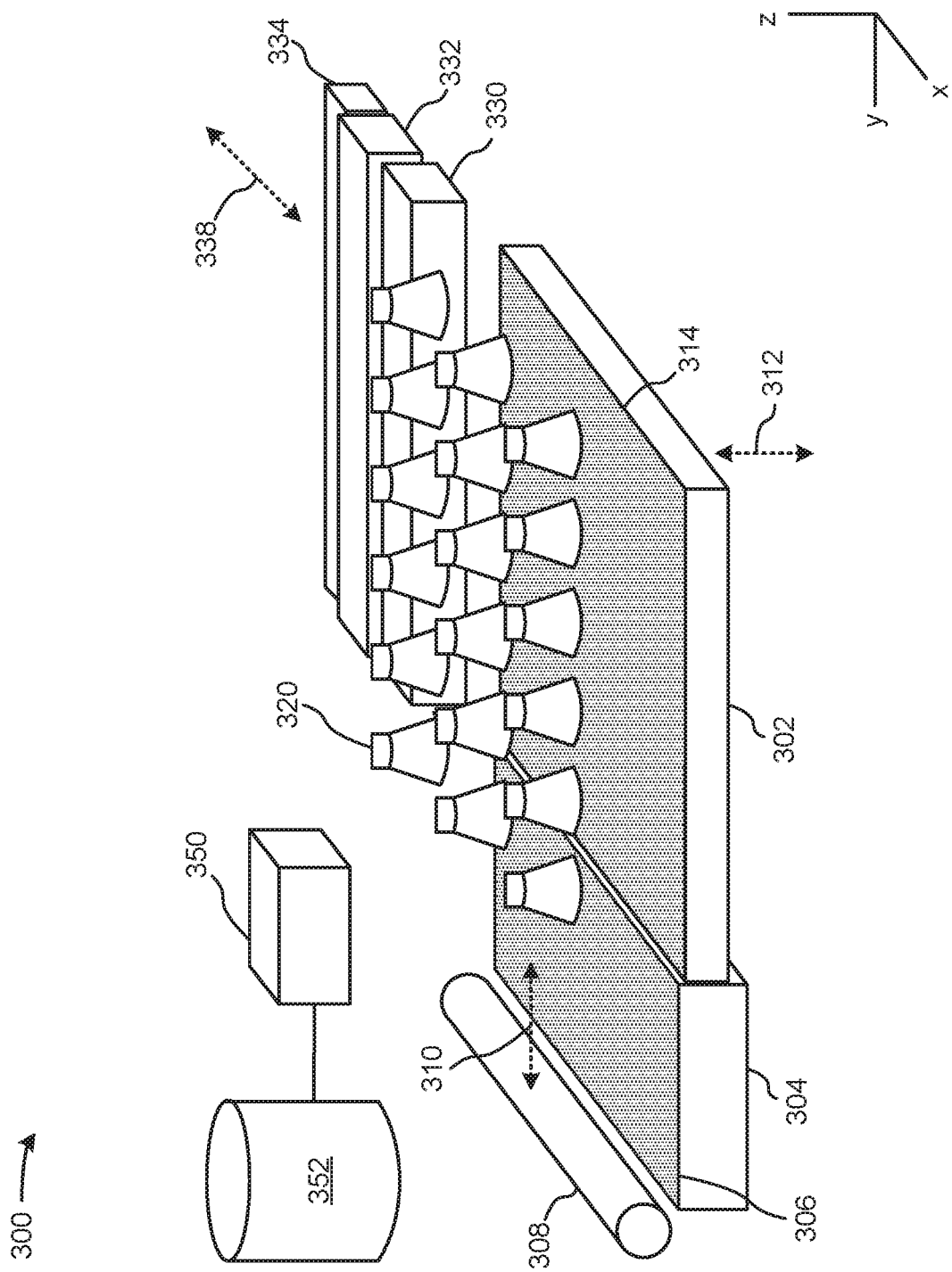
FIG. 3 depicts an isometric view of an example 3D printer that may employ either or both of the printhead assemblies depicted in FIGS. 1A-1C and 2A-2B.

Turning now to FIG. 3, there is shown an isometric view of an example 3D printer 300 that may employ either or both of the printhead assemblies 102 depicted in FIGS. 1A-1C and 2A-2B. It should be understood that the 3D printer 300 depicted in FIG. 3 may include additional components and that some of the components described herein may be removed and/or modified without departing from a scope of the 3D printer disclosed herein.

The 3D printer 300 may include a build area platform 302, a build material supply 304 containing build material particles 306, and a spreader 308. The build material supply 304 may be a container or surface that is used to position build material particles 306 between the spreader 308 and the build area platform 302. The build material supply 304 may be a hopper or a surface upon which the build material particles 306 may be supplied, for instance, from a build material source (not shown) located above the build material supply 304. Additionally, or alternatively, the build material supply 304 may include a mechanism to provide, e.g., move, the build material particles 306 from a storage location to a position to be spread onto the build area platform 302 or a previously formed layer of build material particles 306. For instance, the build material supply 304 may include a hopper, an auger conveyer, or the like. Generally speaking, 3D objects or parts are to be generated from the build material particles 306 and the build material particles 306 may be formed of any suitable material including, but not limited to, polymers, metals, and ceramics. In addition, the build material particles 306 may be in the form of a powder.

The spreader 308 may move in directions as denoted by the arrow 310, e.g., along the y-axis, over the build material supply 304 and across the build area platform 302 to spread a layer 314 of the build material particles 306 over a surface of the build area platform 302. The layer 314 may be formed to a substantially uniform thickness across the build area platform 302. In an example, the thickness of the layer 314 may range from about 90 μm to about 110 μm, although thinner or thicker layers may also be used. For example, the thickness of the layer 314 may range from about 20 μm to about 200 μm, or from about 50 μm to about 200 μm. The spreader 308 may also be returned to a position adjacent the build material supply 304 following the spreading of the build material particles 306. The spreader 308 may be a doctor blade, roller, a counter rotating roller or any other device suitable for spreading the build material particles 306 over the build area platform 302.

The 3D printer 300 may also include a plurality of warming devices 320 arranged in an array above or below the build area platform 302. Each of the warming devices 320 may be a lamp or other heat source that is used to apply heat onto spread layers 314 of the build material particles 306, for instance, to maintain the build material particles 306 at or above a predetermined threshold temperature. According to an example, the warming devices 320 may maintain the temperatures of the build material particles 306 at a relatively high temperature that facilitates the fusing of the build material particles 306 at selected locations, e.g., the build material particles 306 upon which a particular liquid, such as a fusing agent, has been mixed or applied.

The 3D printer 300 may further include a first printhead assembly 330 and a second printhead assembly 332, which may both be scanned across the build area platform 302 in both of the directions indicated by the arrow 338, e.g., along the x-axis. The first printhead assembly 330 and the second printhead assembly 332 may have features similar to those depicted in FIGS. 1A-1C or FIGS. 2A-2B and may extend a width of the build area platform 302. That is, the nozzles 108 of the printheads 106 in the first printhead assembly 330 and the second printhead assembly 332 may deliver droplets 112 of a functional agent or multiple functional agents across a majority of the surface of a layer 314 of build material particles 306.

In other examples, the first printhead assembly 330 and the second printhead assembly 332 may not extend the width of the build area platform 302. In these examples, the first printhead assembly 330 and the second printhead assembly 332 may also be scanned along the y-axis to enable the first printhead assembly 330 and the second printhead assembly 332 to be positioned over a majority of the area above the build area platform 302. The first printhead assembly 330 and the second printhead assembly 332 may be attached to a moving XY stage or a translational carriage (neither of which is shown) that is used to move the first printhead assembly 330 and the second printhead assembly 332 adjacent to the build area platform 302 in order to deposit respective liquid droplets 112 in intended locations on a layer 314 of the build material particles 306.

In some examples, the functional agent is a fusing agent that is to enhance absorption of energy by the build material particles 306 upon which the fusing agent has been deposited. In these examples, a radiation generator 334 may be implemented to apply fusing radiation onto the layer 314 of build materials 306. The fusing radiation may be in the form of light, electromagnetic radiation, microwaves, or the like. Particularly, for instance, the fusing radiation generator 334 may be activated and moved across the layer 314 of build material particles 306, for instance, along the directions indicated by the arrow 338, to apply fusing radiation in the form of light and/or heat onto the build material particles 306. Examples of the radiation generator 334 may include a UV, IR or near-IR curing lamp, IR or near-IR light emitting diodes (LED), halogen lamps emitting in the visible and near-IR range, microwaves, or lasers with desirable electromagnetic wavelengths. The type of fusing radiation generator 334 may depend, at least in part, on the type of active material used in the functional agents applied onto the layer 314 of build material particles 306. In addition or in other examples, the light beams 122 may be composed of radiation having similar types of electromagnetic wavelengths as the fusing radiation generator 334. In these examples, the fusing radiation generator 334 may include the light sources 120 that may generate larger intensities of light to fuse the build material particles 306 and may generate smaller intensities of light to detect the droplets 112.

Following fusing of the build material particles 306 in the selected areas, the build area platform 302 may be lowered as denoted by the arrow 312, e.g., along the z-axis. In addition, the spreader 308 may be moved across the build area platform 302 to form a new layer 314 of build material particles 306 on top of the previously formed layer. Moreover, the first printhead assembly 330 and the second printhead assembly 332 may deliver droplets 112 of a functional agent onto respective selected areas of the new layer of build material particles 306. Furthermore, the radiation generator 334 may be implemented to apply fusing radiation onto the new layer 314 of the build material particles 306 and the build area platform 302 may be lowered. The above-described process may be repeated until a predetermined number of layers have been formed to fabricate a desired 3D part.

As further shown in FIG. 3, the 3D printer 300 may include a controller 350 that may control operations of the 3D printer 300 components including the build area platform 302, the build material supply 304, the spreader 308, the warming devices 320, the first printhead assembly 330, the second printhead assembly 332, and the radiation generator 334. Particularly, for instance, the controller 350 may control firing elements 110 (not shown) to control various operations of the 3D printer 300 components. The controller 350 may be a semiconductor-based microprocessor, a central processing unit (CPU), an application specific integrated circuit (ASIC), a field-programmable gate array (FPGA), graphics processing unit (GPU), Tensor Processing Unit (TPU), and/or other hardware device. Although not shown, the controller 350 may be connected to the 3D printer 300 components via communication lines.

The controller 350 is also depicted as being in communication with a data store 352. The data store 352 may include data pertaining to a 3D part to be printed by the 3D printer 300. For instance, the data may include the locations in each build material layer 314 that the first printhead assembly 330 is to deposit droplets of the functional agent. The data store 352 may also include instructions for determining when nozzles 108 are functioning improperly based upon signals and/or data received from detectors 124 in the printhead assemblies 330, 332 and for handling determinations of improperly functioning nozzles 108. According to examples, the controller 350 may be equivalent to the controller 130 depicted in FIGS. 1A and 2A. In other examples, the controller 350 may receive data from the controller 130 and they communicate instructions to the controller 130. Various manners in which the controller 130 and/or the controller 350 may operate are described in greater detail herein.

Figure 4:
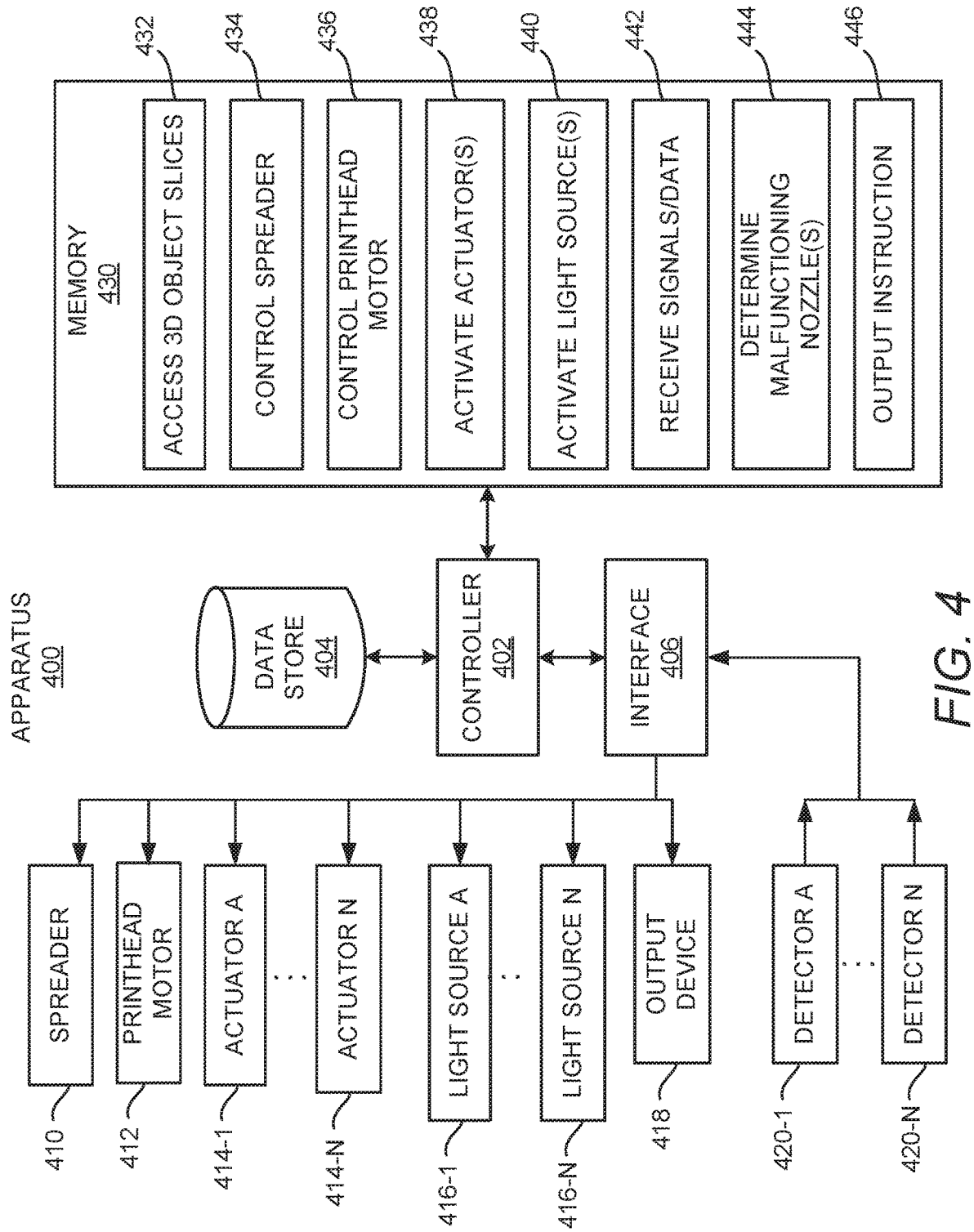
FIG. 4 shows a block diagram of another example apparatus, which may also be a 3D fabricating device, a 3D printer, or the like, that may be implemented to fabricate 3D objects from build material particles.

With reference now to FIG. 4, there is shown a block diagram of another example apparatus 400, which may also be a 3D fabricating device, a 3D printer, or the like, that may be implemented to fabricate 3D objects from build material particles 114, 306. It should be understood that the apparatus 400 depicted in FIG. 4 may include additional components and that some of the components described herein may be removed and/or modified without departing from a scope of the apparatus 400 disclosed herein. The description of the apparatus 400 is made with reference to FIGS. 1A-1C, 2A-2B, and 3.

The apparatus 400 may include a controller 402 that may control operations of the apparatus 400. The controller 402 may be a semiconductor-based microprocessor, a central processing unit (CPU), an application specific integrated circuit (ASIC), a field-programmable gate array (FPGA), graphics processing unit (GPU), Tensor Processing Unit (TPU), and/or other hardware device. The controller 402 may access a data store 404, which may be a Random Access Memory (RAM), an Electrically Erasable Programmable Read-Only Memory (EEPROM), a storage device, an optical disc, and the like. The data store 404 may have stored thereon data pertaining to a 3D object that the apparatus 400 is to fabricate.

The apparatus 400 may also include an interface 406 through which the controller 402 may communicate instructions to a plurality of components contained in the apparatus 400. The interface 406 may be any suitable hardware and/or software through which the controller 402 may communicate the instructions. In some examples, the interface 406 may also enable communication of information from the components to the controller 402. In any regard, the components may include a spreader 410, a printhead motor 412, a plurality of firing elements 110 414-1 to 414-N, a plurality of light sources 416-1 to 416-N, an output device 418, and a plurality of detectors 420-1 to 420-N. The spreader 410 may be equivalent to the spreader 308 depicted in FIG. 3. The firing elements 110 414-1 to 414-N may be equivalent to the firing elements 110, the light sources 416-1 to 416-N maybe equivalent to the light sources 120, and the detectors 420-1 to 420-N may be equivalent to the detectors 124 depicted in FIGS. 1A-1C and 2A-2B. The variable "N" may represent a value greater than one.

The apparatus 400 may also include a memory 430 that may have stored thereon machine readable instructions 432-446 (which may also be termed computer readable instructions) that the controller 402 may execute. The memory 430 may be an electronic, magnetic, optical, or other physical storage device that contains or stores executable instructions. The memory 430 may be, for example, Random Access memory (RAM), an Electrically Erasable Programmable Read-Only Memory (EEPROM), a storage device, an optical disc, and the like. The memory 430, which may also be referred to as a computer readable storage medium, may be a non-transitory machine-readable storage medium, where the term "non-transitory" does not encompass transitory propagating signals.

The controller 402 may fetch, decode, and execute the instructions 432 to access 3D object slices, in which each slice may identify (e.g., contain instructions about) a section of a 3D object that is to be formed in a particular layer 314 of build material particles 114, 306. The controller 402 may fetch, decode, and execute the instructions 434 to control the spreader 410 to spread build material particles 114, 306 into a layer 314. The controller 402 may fetch, decode, and execute the instructions 436 to control the printhead motor 412. The controller 402 may fetch, decode, and execute the instructions 438 to activate an actuator 414-1 or multiple firing elements 414-1 to 414-N contained in nozzles 108. The controller 402 may fetch, decode, and execute the instructions 440 to activate a light source 416-1 or multiple light sources 416-1 to 416-N. The controller 402 may fetch, decode, and execute the instructions 442 to receive signals/data from a detector 420-1 or multiple detectors 420-1 to 420-N. The controller 402 may fetch, decode, and execute the instructions 444 to determine whether any of the nozzles 108 failed to fire a droplet 112 as intended. The controller 402 may fetch, decode, and execute the instructions 446 to output an instruction regarding a malfunctioning nozzle in response to a determination that the nozzle failed to fire a droplet as intended.

The computer readable storage medium 430 may be any electronic, magnetic, optical, or other physical storage device that contains or stores executable instructions. Thus, the computer readable storage medium 430 may be, for example, Random Access Memory (RAM), an Electrically Erasable Programmable Read-Only Memory (EEPROM), a storage device, an optical disc, and the like. The computer readable storage medium 430 may be a non-transitory machine-readable storage medium, where the term "non-transitory" does not encompass transitory propagating signals.

Figure 5:
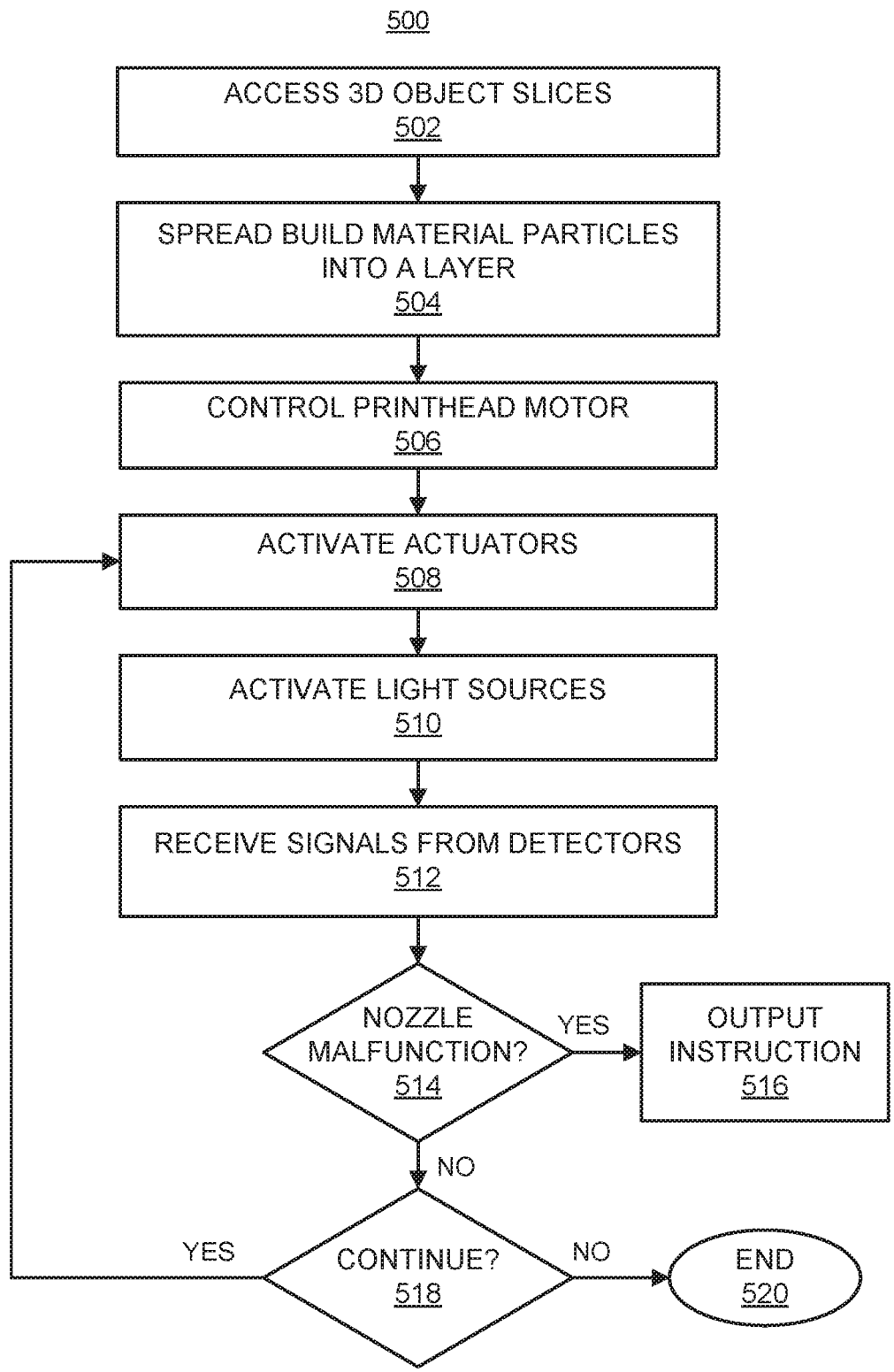
FIG. 5 depicts an example method for detecting a malfunctioning nozzle during a 3D object printing operation with detectors that are mounted to a common housing as a printhead containing the nozzle.

Various manners in which the apparatus 400 may be implemented are discussed in greater detail with respect to the method 500 depicted in FIG. 5. Particularly, FIG. 5 depicts an example method 500 for detecting a malfunctioning nozzle during a 3D object printing operation with detectors that are mounted to a common housing as a printhead containing the nozzle. It should be apparent to those of ordinary skill in the art that the method 500 may represent generalized illustrations and that other operations may be added or existing operations may be removed, modified, or rearranged without departing from the scope of the method 500.

The description of the method 500 is made with reference to the apparatuses 100, 200, 400 illustrated in FIGS. 1A-1C, 2A-2B, and 4 and the 3D printer 300 illustrated in FIG. 4 for purposes of illustration. It should, however, be understood that apparatuses and 3D printers having other configurations may be implemented to perform the method 500 without departing from a scope of the method 500.

At block 502, 3D object slices may be accessed. For instance, the controller 402 may execute the instructions 432 to access the 3D object slices, in which each slice may identify a section of a 3D object that is to be formed in a particular layer of build material particles 114, 306. The controller 402 may access the 3D object slices from the data store 404, from a user input, over a network, etc.

At block 504, a layer 314 of build material particles 114, 306 may be spread across the build area platform 302. For instance, the controller 402 may execute the instructions 434 to control a spreader 308, 410 to spread a pile of build material particles 114, 306 across the build area platform 302 to form the layer 314 of build material particles 114, 306.

At block 506, a printhead motor 412 may be controlled to cause a printhead 106, 330, 332 to move across the spread layer 314 of build material particles 114, 306. The printhead motor 412 may thus be a motor that may cause a carriage on which the printhead 106, 330, 332 is supported to move across the spread layer 314. In this regard, activation of the printhead motor 412 may cause the printhead 106, 330, 332 to move in the directions denoted by the arrow 338 in FIG. 3. In addition, in some examples, activation of the printhead motor 412 may cause the printhead 106, 330, 332 to move along the y-axis as shown in FIG. 3. In any regard, the controller 402 may execute the instructions 436 to control the printhead motor 412 and thus the movement of the printhead 106, 330, 332 across the layer 314.

At block 508, a plurality of firing elements 414-1 to 414-N may selectively be activated to fire droplets 112 of a functional agent from the nozzles 108 onto selected locations of the layer 314 of build material particles 114, 306. That is, the controller 402 may execute the instructions 438 to selectively activate some or all of the firing elements 110 414-1 to 414-N as the printhead 106, 330, 332 is moved (e.g., scanned) across the layer 314 of build material particles 114, 306 to cause droplets 112 of a functional agent to be fired onto selected locations on the layer 314. For instance, the controller 402 may selectively activate the firing elements 414-1 to 414-N as the printhead 106, 330, 332 is moved to deliver the droplets 112 of the functional agent onto the locations on the layer 314 that are to be fused together. The locations at which the droplets 112 are to be delivered may be defined by the accessed 3D object slices, e.g., the object slice for a current layer 314.

At block 510, a plurality of light sources 416-1 to 416-N may be activated to direct respective light beams 122 to intersect with flight paths 116 of the droplets 112 fired from the nozzles 108. The controller 402 may execute the instructions 440 to activate the light sources 416-1 to 416-N and to keep the light sources 416-1 to 416-N active for a duration of time that covers a period of time that it normally takes for droplets fired by the firing elements 414-1 to 414-N to pass through the respective light beams 122. In some examples, the controller 402 may activate each of the light sources 416-1 to 416-N. In other examples, the controller 402 may activate those light sources 416-1 to 416-N that direct light beams 122 in the flight paths 116 of the firing elements 414-1 to 416-N that are activated. In these examples, the controller 402 may activate a light source 416-1 when the controller 402 activates an actuator 414-1 that is to fire a droplet 112 through the light beam 122 emitted from the light source 416-1. In addition, the controller 402 may deactivate the light source 416-1 after expiration of a duration of time that covers a period of time that it normally takes for a droplet fired by the actuator 414-1 to pass through the light beam 122.

As discussed above, in some examples, the light sources 416-1 to 416-N may direct the light beams 122 to cross the droplet 112 flight paths 116 prior to the droplets 112 reaching the layer of build material particles 114, 306. In addition or in other examples, the light sources 416-1 to 416-N may direct the light beams 122 to cross the droplet 112 flight paths 116 on the surface of the layer of build material particles 114, 306. That is, for instance, the light beams 122 may be directed to reflect off the surface of the layer of build material particles 114, 306 at locations on which the droplets 112 are to land. In still other examples, the light sources 416-1 to 416-N may move the light beams 122, e.g., scan the light beams 122, in one or more directions, which may enhance detection of the droplets 112.

At block 512, the controller 402 may receive signals from the detectors 420-1 to 420-N, in which the signals may correspond to whether or not the droplets 112 were detected to have been fired from the nozzles 108 as intended. As discussed herein, the detectors 420-1 to 420-N, which may also be termed photodetectors, may collect light beams 122 that the light sources 416-1 to 416-N have outputted. That is, each of the detectors 420-1 to 420-N may be positioned to collect a light beam 122 emitted from a corresponding light source 416-1 to 416-N, e.g., a first detector 420-1 may be positioned to collect a light beam 122 emitted from a first light source 414-1, a second detector 420-2 may be positioned to collect a light beam 122 emitted from a second light source 414-2, etc. In addition, or in other examples, light beams 122 originating from a common light source 414-1 may be filtered, for instance, with a collimating mechanism or lens, to be directed to the first detector 420-1, the second detector 420-2, etc.

Each of the detectors 420-1 to 420-N may generate a signal corresponding to the intensity of the light that the detectors 420-1 to 420-N collect and may send the generated signals to the controller 402. Thus, for instance, a detector 420-1 may generate a first signal in response to the collected light being at a first intensity level, may generate a second signal in response to the collected light being at a second intensity level, and so forth. By way of particular example, the detector 420-1 may generate a first signal if the light beam 122 directed from the light source 416-1 corresponding to the detector 420-1 is collected without interference as may occur when a droplet 112 does not pass through the light beam 122. The detector 420-1 may generate a second signal if the light beam 122 is collected with a relatively small amount of interference as may occur when the droplet 112 is smaller than intended, e.g., has a smaller volume that intended. The detector 420-1 may generate a third signal if the light beam 122 is obstructed during collection as may occur when the droplet 112 has an intended volume.

At block 514, a determination may be made from the received signals as to whether any of the nozzles 108 malfunctioned. That is, the controller 402 may execute the instructions 444 to determine, from the signals received from the detectors 420-1 to 420-N, whether any of the nozzles 108 failed to fire a droplet 112 as intended. The controller 402 may determine that a particular nozzle 108 failed to fire a droplet 112 as intended if a firing signal was sent to the actuator 414-1 of the particular nozzle 108, the light source 416-1 was activated to emit a light beam 122, and the detector 420-1 sent a signal indicative of a droplet 112 either not crossing through the light beam 122 or having an insufficient volume within a certain period of time following the transmission of the firing signal. Thus, for instance, the controller 402 may determine from the signal received from the detector 420-1 that a droplet 112 was either not fired from the particular nozzle 108 or that the fired droplet 112 was not fired as intended, e.g., with the proper volume.

In response to a determination that a nozzle 108 and/or multiple nozzles 108 have malfunctioned at block 514, the controller 402 may execute the instructions 446 to output an instruction as indicated at block 516. In some examples, the controller 402 may output an instruction to the output device 418 to issue an alert for an operator to be informed that a nozzle has or that multiple nozzles 108 have malfunctioned. In these examples, the controller 402 may cease printing operations until an operator decides to continue with the printing operation. In other examples, the controller 402 may output an instruction that is to cause a mitigation operation to be performed to compensate for the malfunction nozzle or nozzles 108. The mitigation operation may include, for instance, implementing another nozzle or multiple other nozzles 108 to deposit droplets 112 of a functional agent onto the locations of the layer of build material particles 114, 306 upon which the malfunctioning nozzle or nozzles 108 were intended to deposit the droplets 112.

According to other examples, and as shown in FIG. 6, the controller 402 may implement other operations at block 516. That is, FIG. 6 depicts a flow diagram of a method 600 that may be implemented as part of or in place of block 516 in FIG. 5. In this regard, at block 602, the controller 402 may determine that a nozzle or that multiple nozzles 108 have malfunctioned. In addition, at block 604, the controller 402 may determine a print quality level selected for the 3D object that is in the process of being printed. That is, a user may select to print the 3D object at one of multiple print quality levels, e.g., a high quality level, a low quality level (e.g., a draft mode), etc. The print quality at which the 3D object is to be printed may be based upon various considerations, for instance, the criticality of the 3D object, tolerance adherence requirements, etc.

At block 606, the controller 402 may determine whether the selected print quality level exceeds a certain print quality level. For instance, the controller 402 may determine at block 606 whether the selected print quality level is the high quality level or the low quality level. In response to a determination that the selected print quality level exceeds the certain print quality level at block 606, e.g., that the 3D object is to be printed at a high quality level, the controller 402 may cease printing of the 3D object as indicated at block 608. That is, the controller 402 may stop activating the firing elements 414-1 to 414-N to thus stop firing of droplets 112 onto the layer of build material particles 114, 306. However, in response to a determination that the selected print quality level falls below the certain print quality level at block 606, e.g., that the 3D object is to be printed at a low quality level, the controller 402 may continue printing of the 3D object as indicated at block 610. That is, the controller 402 may continue activating the firing elements 414-1 to 414-N to thus continue firing droplets 112 onto the layer of build material particles 114, 306 as the printhead 106, 330, 332 is moved across the layer of build material particles 114, 306. Thus, for instance, the 3D object may continue to be fabricated with defects if the selected quality level for the 3D object is low.

With reference back to FIG. 5, in response to a determination at block 514 that none of the nozzles 108 has malfunctioned or following the determination to continue printing at block 610 in FIG. 6, a determination may be made as to whether the method 500 is to be continued at block 518. The controller 402 may determine that the method 500 is to be continued in instances in which additional areas of the layer of build material particles 114, 306 are to be fused together, additional sections of the 3D object are to be formed from additional layers of build material particles 114, etc. In response to a determination that the method 500 is to be continued, the controller 402 may repeat blocks 508-518 until a determination that the method 500 is to be discontinued is made at block 518, at which the method 500 may end as indicated at block 520.

According to examples, blocks 510-518 may be performed each time the firing elements 414-1 to 414-N are activated. In other examples, blocks 510-518 may be performed at predefined periods of time, once for each of the firing elements 414-1 to 414-N during a printing operation, once for each of the firing elements 414-1 to 414-N during an initial activation of the firing elements 414-1 to 414-N for printing onto a newly formed layer of build material particles 114, 306, or the like. In addition, the detectors 124 may undergo testing and/or calibration operations periodically and/or over time to ensure that the detectors 124, 420-1 to 420-N are operating properly, e.g., accurately detecting the droplet 112.

Some or all of the operations set forth in the methods 500 and 600 may be contained as programs or subprograms in any desired computer accessible medium. In addition, the methods 500 and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a printhead assembly containing:
   a housing;
   a printhead having nozzles that are activated to fire droplets of a functional agent onto a layer of build material particles along flight paths to form sections of a three-dimensional (3D) object from the build material particles;
   light emission devices that, in response to the activation of the nozzles to fire the droplets, are activated for a predetermined period of time to direct light beams across the flight paths of the droplets, wherein the predetermined period of time is a stored time duration value for the droplets to travel from the nozzles to the layer of build material particles, wherein each particular light emission device of the light emission devices corresponds to one particular nozzle of the nozzles, and in response to the particular nozzle being activated to fire the droplets, the particular light emission device is activated for the predetermined period of time; and
   photon detectors located across the flight paths of the droplets from the light emission devices to detect the light beams directed from the light emission devices; and
   a controller connected to the printhead assembly to:
   receive signals from the photon detectors,
   determine intensity levels of the light beams detected by the photon detectors based on the received signals, wherein the intensity levels of the light beams correspond to whether the droplets were fired from the nozzles during the predetermined period of time as intended,
   based on the determined intensity levels of the light beams, determine whether any of the nozzles failed to fire a droplet as intended, and
   in response to a determination that a first nozzle of the nozzles failed to fire a droplet as intended, output an indication that the first nozzle is operating improperly.

2. The apparatus according to claim 1, wherein each of the nozzles includes a chamber and a firing element, and
   wherein an activation of the firing element in each nozzle is to cause a droplet of the functional agent to be fired from the chamber of the nozzle, and cause an activation of a corresponding light emission device.

3. The apparatus according to claim 1, wherein the controller is to determine that the first nozzle is operating improperly in response to a determination that an intensity level of the light beam that is directed through the flight path of a droplet fired from the first nozzle is detected to be higher than a certain threshold level during the predetermined period of time.

4. The apparatus according to claim 1, wherein the controller is further to implement a mitigation operation and stop the printhead from firing the droplets of the functional agent onto the layer of build material particles in response to the determination that the first nozzle is operating improperly.

5. The apparatus according to claim 1, wherein the controller is to determine a print quality level selected for the 3D object, and wherein the controller is to determine whether to stop fabrication of the 3D object in response to a determination that the first nozzle is operating improperly based upon the determined print quality level selected for the 3D object.

6. The apparatus according to claim 1, wherein the controller is further to determine the intensity levels of the light beams based on a timing at which the light beams are interrupted by the droplets.

7. The apparatus according to claim 1, wherein the light emission devices are vertical-cavity surface-emitting lasers.

8. The apparatus according to claim 1, wherein the light emission devices are to direct the light beams at selected locations on the layer of build material particles and wherein the photon detectors are to detect the light beams reflected from the selected locations on the layer of build material particles.

9. The apparatus according to claim 1, wherein the light emission devices are movable to move the light beams and wherein the photon detectors are to detect the light beams as the light beams are moved.

10. A method comprising:
    spreading build material particles into a layer of build material particles;
    activating, by a controller, firing elements inside chambers of nozzles in a printhead to selectively fire droplets of a functional agent from the nozzles onto the layer of build material particles to form a section of a three-dimensional (3D) object from the build material particles, the printhead being mounted to a housing;
    in response to the activation of the firing elements, activating, by the controller, light sources for a predetermined period of time to direct light beams across flight paths of the droplets fired from the nozzles, wherein the predetermined period of time is a stored time duration value for the droplets to travel from the nozzles to the layer of build material particles, wherein each particular light source of the light sources corresponds to one particular nozzle of the nozzles, and in response to the particular nozzle being activated to fire the droplets, the particular light source is activated for the predetermined period of time;
    detecting, by photon detectors, the light beams directed from the light sources across the flight paths of the droplets for the predetermined period of time;
    determining, by the controller, intensity levels of the light beams detected by the photon detectors, wherein the intensity levels of the light beams correspond to whether or not the droplets were fired from the nozzles during the predetermined period of time as intended;
    based on the determined intensity levels of the light beams, determining, by the controller, whether any of the nozzles failed to fire a droplet as intended; and
    in response to a determination that a first nozzle of the nozzles failed to fire a droplet as intended, outputting, by the controller, an indication that the first nozzle is a malfunctioning nozzle.

11. The method according to claim 10, wherein each of the light sources corresponds to a respective firing element, the method further comprising: activating the light sources respectively corresponding to the activated firing elements.

12. The method according to claim 10, wherein determining that the first nozzle has failed to fire a droplet as intended in response to a received signal indicating that a droplet has not been detected, that a volume of a detected droplet falls below a predefined volume, or a composition of a detected droplet is improper.

13. The method according to claim 10, further comprising:
    determining a print quality level selected for the 3D object;

determining whether the selected print quality level exceeds a certain print quality level;

in response to a determination that the selected print quality level exceeds the certain print quality level, ceasing the activation of the firing elements; and in response to a determination that the selected print quality level falls below the certain print quality level, continuing the activation of the firing elements.

14. A three-dimensional (3D) printing apparatus comprising:

a spreader to spread build material particles into a layer of build material particles;

a printhead assembly containing:

a printhead having nozzles that are activated to fire droplets of a functional agent onto the layer of build material particles along flight paths to form sections of a 3D object from the build material particles;

a plurality of light sources that, in response to the activation of the nozzles to fire the droplets, are activated for a predetermined period of time to direct light beams across the flight paths of the droplets, wherein the predetermined period of time is a stored time duration value for the droplets to travel from the nozzles to the layer of build material particles, wherein each particular light source of the light sources corresponds to one particular nozzle of the nozzles, and in response to the particular nozzle being activated to fire the droplets, the particular light source is activated for the predetermined period of time; and a plurality of photodetectors located across the flight paths of the droplets from the plurality of light sources to detect the light beams directed from the plurality of light sources; and a controller to:

receive signals from the plurality of photodetectors;

determine intensity levels of the light beams detected by the plurality of photodetectors based on the received signals, wherein the intensity levels of the light beams detected by the plurality of photodetectors correspond to whether the droplets were fired from the nozzles during the predetermined period of time as intended;

based on the intensity levels of the light beams detected by the plurality of photodetectors, determine whether any of the nozzles failed to fire a droplet as intended; and in response to a determination that a first nozzle of the nozzles failed to fire a droplet as intended, output an indication that the first nozzle is a malfunctioning nozzle.

15. The 3D printing apparatus according to claim 14, wherein the controller is further to:

determine a print quality level selected for the 3D object;

determine whether the selected print quality level exceeds a certain print quality level; and in response to a determination that the selected print quality level exceeds the certain print quality level, output an instruction to cease firing of the droplets.

* * * * *